H. R. Wolfe.
Circular Saw Mill.

N° 17,346.      Patented May 19, 1857.

UNITED STATES PATENT OFFICE.

H. R. WOLFE, OF LOUISVILLE, KENTUCKY.

DEVICE FOR ALLOWING PLAY TO THE ARBORS OF CIRCULAR SAWS.

Specification of Letters Patent No. 17,346, dated May 19, 1857.

*To all whom it may concern:*

Be it known that I, HARVEY R. WOLFE, of Louisville, in the county of Jefferson and State of Kentucky, have invented a new and useful Improvement in Circular-Saw Mills; and I do hereby declare that the following is a full, clear, and exact description of the same, reference being had to the annexed drawings, making a part of this specification, in which—

Figure 1:
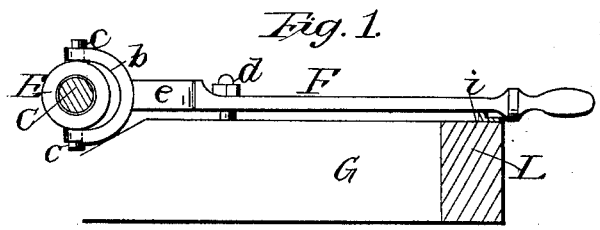
Figure 2:
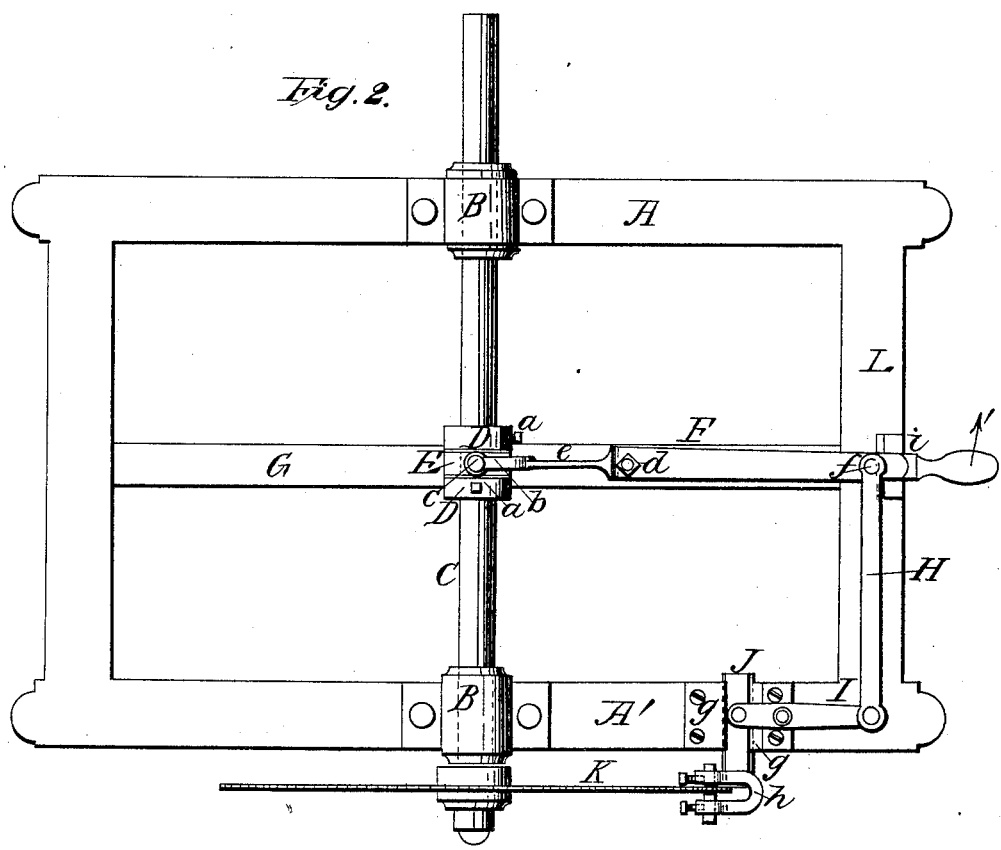

Figure 1 is a transverse section of the saw arbor, taken in the line $(x)$, $(x)$, Fig. 2. Fig. 2 is a plan or top view of my improvement.

Similar letters of reference indicate corresponding parts in the several figures.

My invention consists in allowing the saw arbor or shaft a longitudinal play or movement in its bearings and having said arbor or shaft connected with a spring bar which is connected to the saw guide by means of a lever and connecting rod, the parts being so arranged that the necessary lateral play or movement is allowed the saw, which is always brought in a proper relative position with the log at the commencement of each cut, and the saw and its guide both moved by actuating said spring bar by hand, so that the saw may be moved from the log as the log is gigged back, the spring bar serving the double purpose of spring and lever, as will be hereinafter fully shown and described.

To enable those skilled in the art to fully understand and construct my invention, I will proceed to describe it.

A, A', represent two bed pieces on which the bearings B, B, of the saw arbor or shaft C are secured. The arbor or shaft is allowed to work or play longitudinally in its bearings and two collars D, D, are secured upon the arbor or shaft C by set screws $(a)$ $(a)$. Between the two collars D, D, and upon the shaft or arbor C, a collar E is placed. The collar E is placed loosely on the arbor or shaft, and a fork $(b)$ is secured to it by pins or screws $(c)$ $(c)$. The fork $(b)$ is connected with a spring bar or lever F which works on a fulcrum pin $(d)$, said pin passing through a beam G which is parallel with the bed pieces A, A. The inner end of the bar or lever F as shown at $(e)$ is made quite thin compared with the other portion. This part $(e)$ serves as a spring, the other or outer portion being rigid. The outer end of the bar or lever F has a rod H attached to it by a pivot $(f)$ and this rod is pivoted to one end of a lever I, on the bed piece A' adjoining the saw. The opposite end of the lever I is pivoted to a slide J which is fitted and works between guides $(g)$ $(g)$ secured transversely on the bed piece A'. The slide J has a guide $(h)$ on its outer end, said guide being fitted over the edge of the saw. This guide is of the usual construction and therefore a minute description is not required.

K represents a circular saw which is attached to the arbor or shaft C in the usual way.

The outer end of the bar or lever F is fitted in a catch $i$ on a cross rail L connected to one end of the bed pieces. When the bar or lever F is fitted in the catch $(i)$ the bar is prevented from turning on its fulcrum pin $(d)$, and the spring or elastic portion $(e)$ of the bar or lever F will allow the saw K while passing through the log to give or yield laterally when necessary so that the saw will not be bent, broken, nor heated in consequence of the tendency of knots, checks, etc., to deflect the saw from its true course. The spring $(e)$ will always bring the saw back to its original position at the commencement of each cut. When the log is gigged back the lever or bar F is actuated or moved in the direction indicated by arrow 1 by the attendant so that the saw K and guide will be moved or thrown out simultaneously from the side of the log and the face or sawed side of the log will consequently be freed from the saw, so that as the log is gigged back the saw cannot mar or disfigure the sawed or face side of the log.

From the above description of parts it will be seen that the bar or lever F answers the purpose of both spring and lever, and the object of the invention or the end to be obtained is accomplished by exceedingly simple means.

I am aware that springs have been applied to saw mandrels or arbors in various ways, for the purpose of allowing the saw to have a lateral movement or play; and I therefore do not claim such movement in the abstract or irrespective of the peculiar arrangement of the parts herein shown and described; but,

Having thus described my invention, what I claim as new, and desire to secure by Letters Patent, is:

The bar or lever F, having an elastic and a stiff or rigid portion, and pivoted to the bar G as shown, the elastic end (e) of the bar or lever F being connected with the saw arbor or shaft C, and the stiff or rigid part with the sliding guide (h) through the medium of the rod H and lever I; the above parts being arranged substantially as herein shown, whereby the bar or lever F performs the double function of spring and lever; the saw and guide being both moved laterally when necessary by actuating the bar or lever, and when the outer end of the bar or lever is secured or made permanent the inner end or part serving as a spring to allow the saw an independent lateral play or movement.

H. R. WOLFE.

Witnesses:
N. M. WALLER,
W. P. FRANE.